United States Patent [19]
Helberg

[11] 3,887,013
[45] June 3, 1975

[54] SOD CUTTING AND STACKING MACHINE
[75] Inventor: Wilbur Helberg, Bowling Green, Ohio
[73] Assignee: Tri-County Machine Products, Inc., Grand Rapids, Ohio
[22] Filed: June 24, 1974
[21] Appl. No.: 482,091

[52] U.S. Cl. ............... 172/20; 214/6 B; 214/6 DK; 214/6 H
[51] Int. Cl.² ................. A01B 45/04; B65G 57/00
[58] Field of Search ............ 178/20, 19; 114/6, 6 B, 114/6 K, 6 DK, 6 H, 6 N

[56] References Cited
UNITED STATES PATENTS

| | | | |
|---|---|---|---|
| 3,480,161 | 11/1969 | Bason | 214/6 A |
| 3,590,927 | 7/1971 | Brouwer et al. | 172/19 |
| 3,664,432 | 5/1972 | Nunes | 172/19 |
| 3,672,452 | 6/1972 | Miner | 172/19 |
| 3,675,793 | 7/1972 | Wetzel | 172/20 |
| 3,807,505 | 4/1974 | Nunes | 172/20 |

*Primary Examiner*—Stephen C. Pellegrino
*Attorney, Agent, or Firm*—Vincent L. Barker, Jr.; Thomas M. Freiburger

[57] ABSTRACT

A power driven machine for cutting ribbons of sod or like material from the ground, severing the ribbons into short strips and stacking the severed strips in criss-cross fashion upon a pallet. The machine includes multiple horizontal cutting blades at ground level for cutting a plurality of endless sod ribbons as the machine traverses across a field. The endless ribbons are carried side-by-side by an elevating conveyor to an upper horizontal platform where they are transversely severed into strips whose length is generally equal to the total width of the plurality of ribbons. Alternate groups of severed strips are then turned at right angles and deposited with subsequent groups upon a descending platform to form a vertical stack of severed strips placed upon each other in criss-cross fashion upon a pallet which may be subsequently picked up for movement from the field.

19 Claims, 11 Drawing Figures

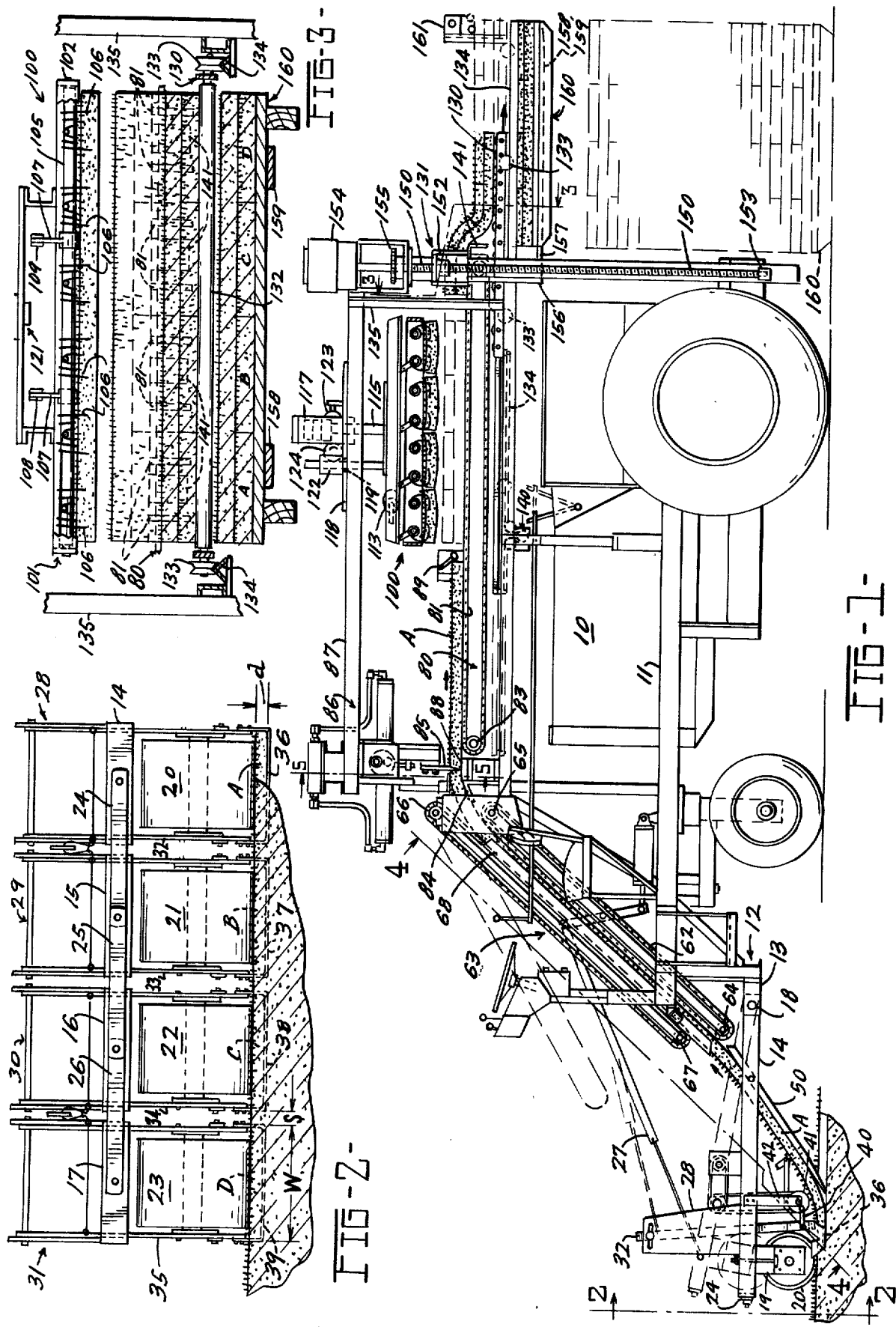

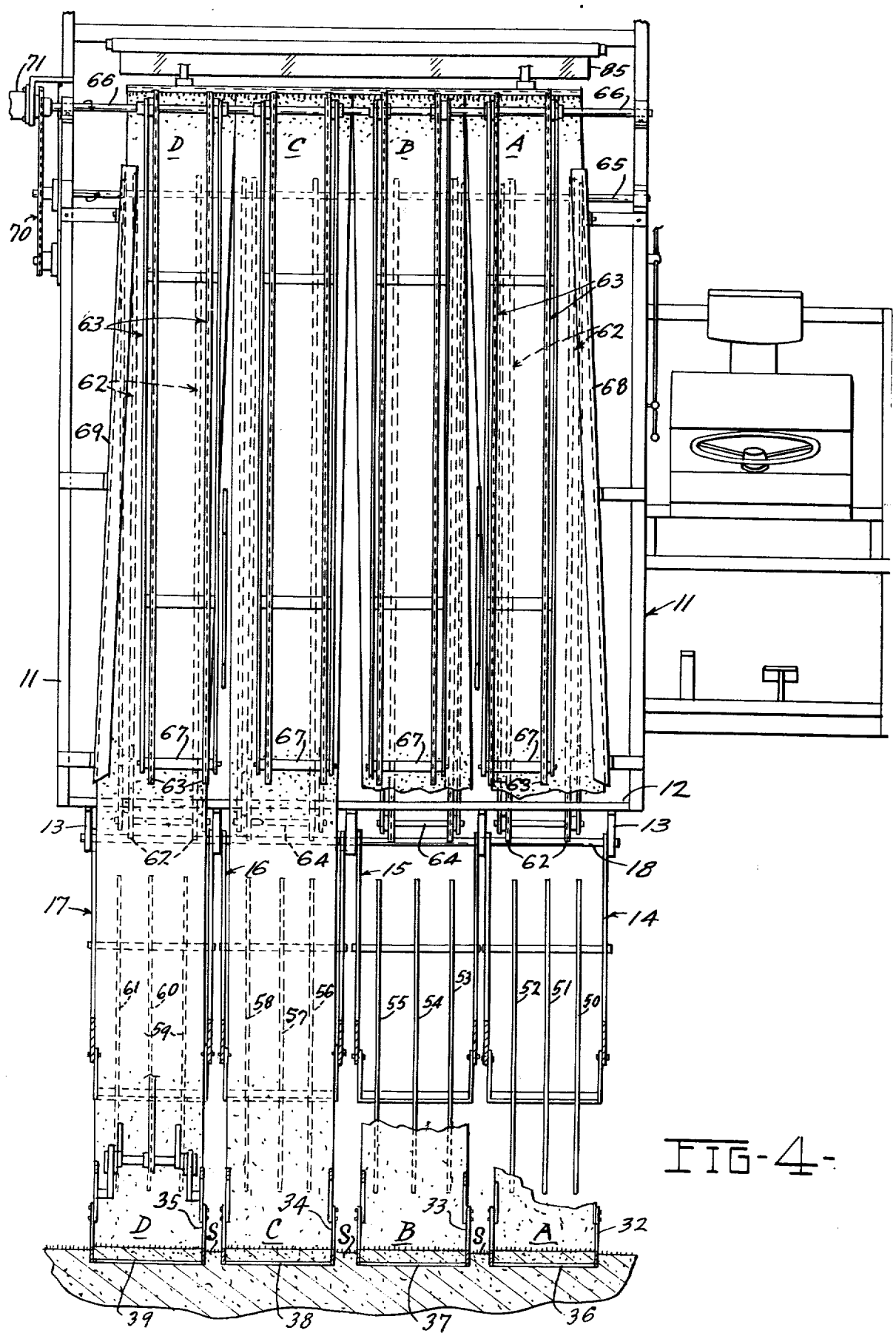
FIG-4-

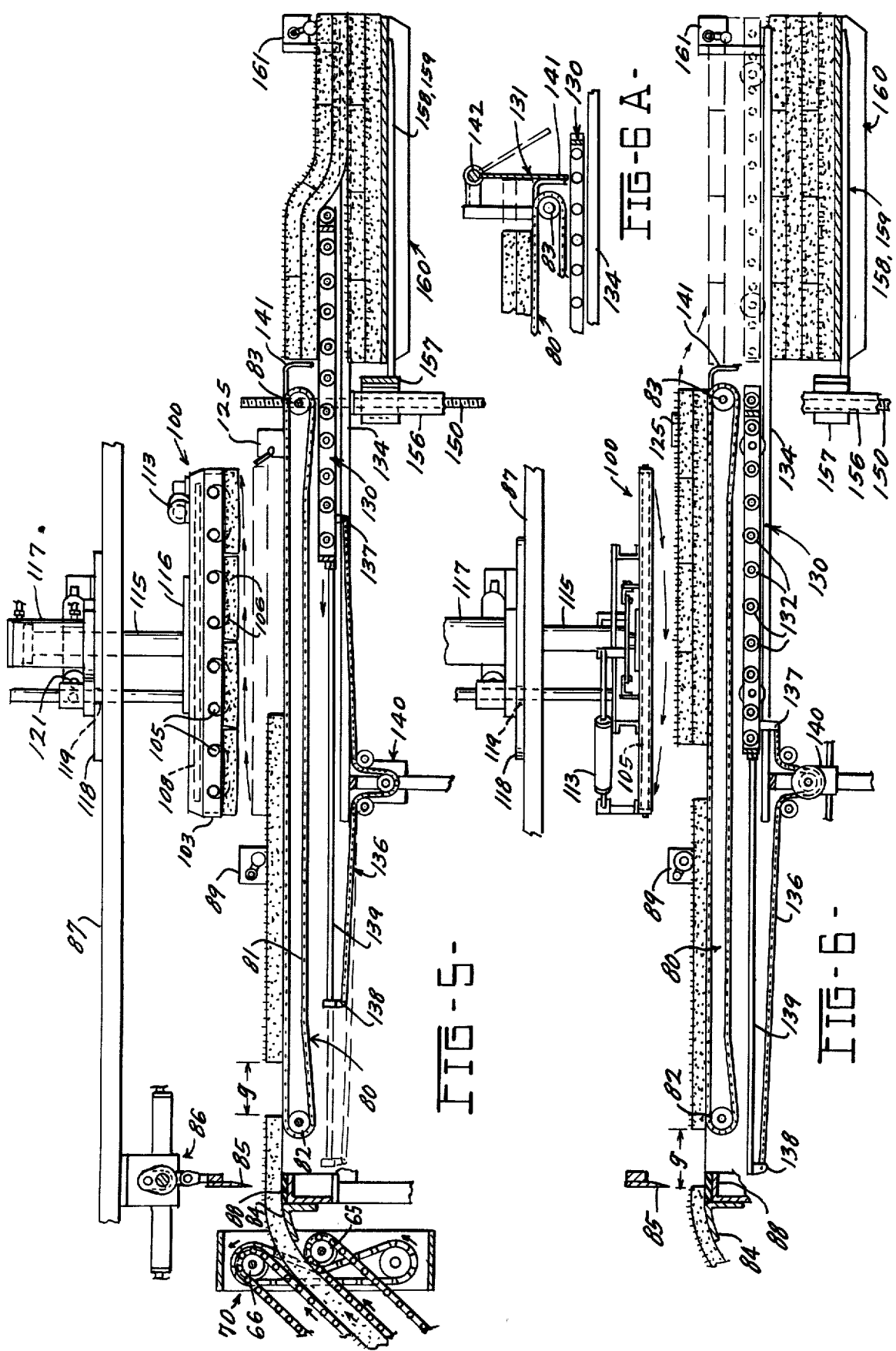

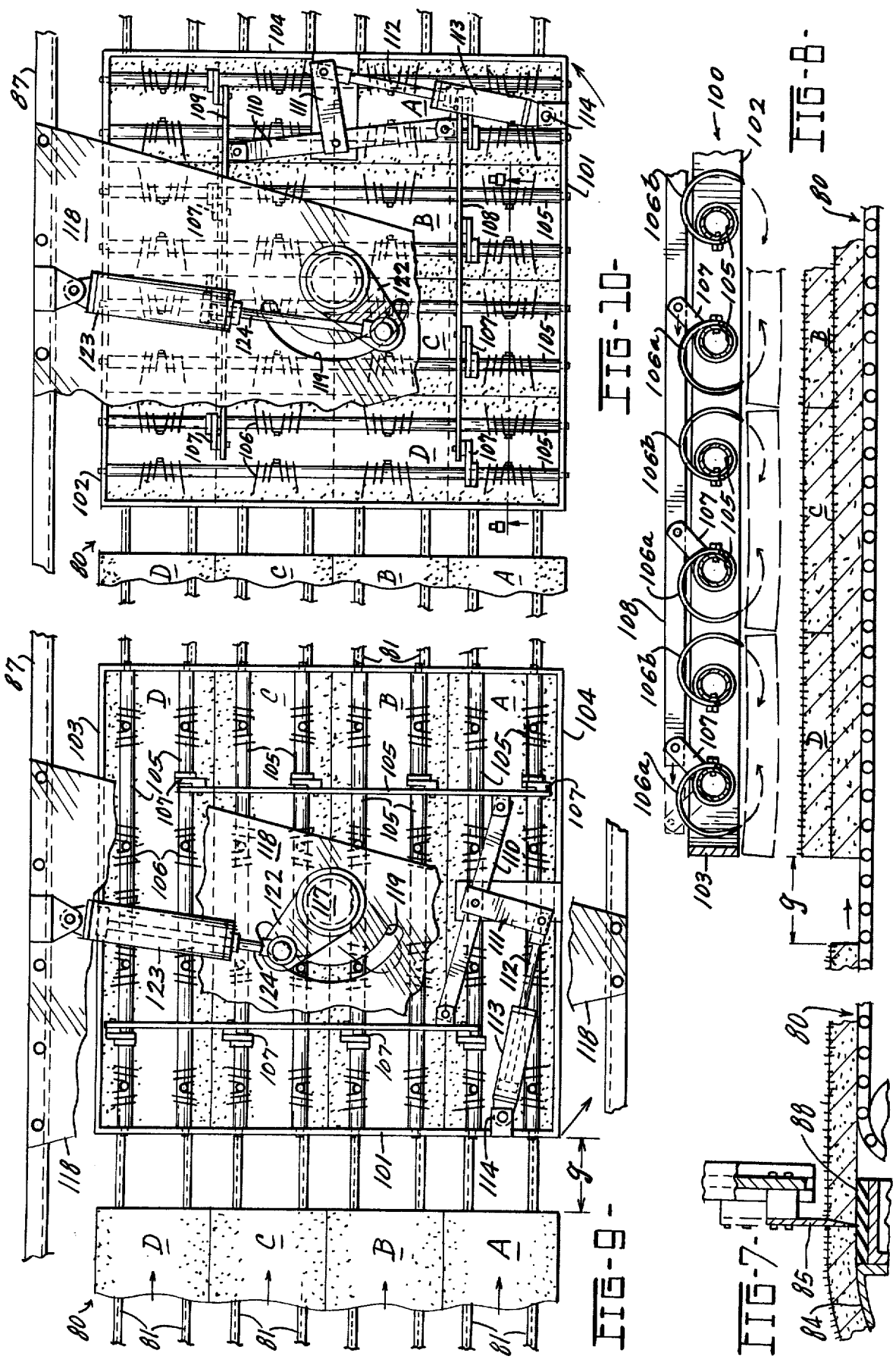

SOD CUTTING AND STACKING MACHINE

BACKGROUND OF THE INVENTION

1. Brief Summary of the Invention

This invention relates to an apparatus and process for continuously harvesting sod or similar such materials and for placing strips of the sod and the like into vertical stacks for subsequent transportation to the point on installation. The invention contemplates a power-driven chassis which is guided by a driver across the sod field and which continuously severs endless ribbons of sod as the apparatus progresses across the field. The endless ribbons are conveyed upwardly upon the machine and are brought together as closely adjacent parallel ribbons. The ribbons are cut transversely of their length as a group to form groups of closely parallel sod strips of finite length; as the groups of sod strips progress toward the rear of the machine, selected groups are rotated 90° in a horizontal plane from the remaining groups and then each of the rotated and non-rotated groups are placed in a vertical stack in crisscross fashion at the rear of the machine. When the stack has reached a desired height, the stack is deposited upon the ground as the machine continues its harvesting operation over the remainder of the field.

2. Brief Description of the Prior Art

Power-driven sod cutting or harvesting machines are known in the art and generally include a driven chassis which progresses across the field, cutting a continuous ribbon of sod which is conveyed from the ground upwardly upon the machine. In many cases, the ribbon is cut into finite lengths and these lengths are curled or rolled into sod rolls which are subsequently deposited upon the ground or in a receptacle for further handling. Examples of such sod cutting and winding machines are shown in U.S. Pat. Nos. 2,756,661; 3,235,011; 3,375,877; 3,429,377; 3,464,641; 3,485,304; 3,648,779; 3,650,330 and 3,653,448.

While rolls of sod as would be provided by devices described above and shown in the aforementioned patents can be individually handled, there are certain disadvantages with rolled sod as are pointed out in U.S. Pat. No. 3,675,793. In addition to these disadvantages caused by deforming the sod, the cylindrical rolls of sod naturally do not stack perfectly in a truck bed or other rectangular container and therefore less sod can be transported in a container of given volume. These disadvantages have prompted efforts to maintain the sod in flat form such as short strips or folded strips. For example, U.S. Pat. No. 3,519,082 shows a device for folding strips of sod into finite lengths with the growing or grass surface of the sod facing each other within the folds; while this reduces the planar area of a sod strip and makes it possible to be manually handled, the sharpness of the fold often causes the sod to crease or break, particularly if it becomes slightly dry. In addition, the folds must necessarily be stacked in some manner upon a truck bed or other transporting device and must be alternated to keep a stack of uniform height because the width of the fold is greater than twice the sod depth, unless the fold is crushed. Crushing the fold is injurious to the sod and thus the height of a stack of folded sod must be limited since the lowermost folds will be crushed from the weight of the stack.

Another approach is to sever the continuous ribbons of sod into finite lengths and to stack these strips in a vertical array for transportation on a truck or other carrier. Existing sod cutting machines usually sever the sod from the ground in ribbons approximately one foot wide and usually no more than sixteen inches wide. This is because the nature of the horizontal cutter is such that it is difficult to effectively cut ribbons much wider than this and, if the ribbons or subsequent cut strips were as large as, for example, three feet or four feet square, they would be too heavy for manual handling which is necessary in the sod installation process. On the other hand, a strip of sod cut from a one foot wide ribbon which is three or four feet in length is light enough for manual handling but presents a problem in stacking. It will be apparent that a stable stack of sod strips one foot wide cannot be made over two feet high or so because the small width dimension makes a higher stack very unstable and apt to fall over in transit. Because by nature the dimensions of sod are non-uniform and the sod itself may sometimes be broken or flattened on one side, the sod strips cannot be stacked with any accuracy such as would be the case with ply wood or other planar sheets.

To overcome this defect, various types of stacking guides having peripheral posts, wires or other means have been used to facilitate the stacking of such strips in high piles. It is also known that strips can be manually stacked upon a pallet or truck bed either against vertical sidewalls or guides or in random or interleaved fashion so that the small one-foot dimension does not always fall in the same direction. This approach, of course, requires further manual labor to take the strips from the harvesting machine and place them upon the truck or pallet in such a careful manner to permit a stack of substantial height. If the stack is to be approximately 5 feet high, this manual stacking process must be carefully done and is very tedious and time-consuming, particularly when the upper portions of the stack approach five feet which requires considerable lifting and placement thereupon.

SUMMARY AND OBJECTS OF THE INVENTION

The present invention consists of an apparatus and method which solves the problems encountered by the industry as described above and at the same time substantially eliminates a large portion of the manual labor required in a sod cutting operation. Recognizing that sod is most conveniently and effectively cut in ribbons approximately one foot wide, the apparatus of this invention provides a moving chassis which, while traversing across the field, will cut endless ribbons of sod of the desired one-foot width which are subsequently conveyed upwardly upon the chassis in a parallel side-by-side relationship. Conveniently for subsequent stacking purposes, three or preferably four endless ribbons are simultaneously cut and conveyed upon the chassis in side-by-side relationship so that a band of ribbons approximately 4 feet wide is continuously presented to the apparatus as it moves across the field. Using this example of four one-foot wide ribbons in a band, the apparatus continuously laterally severs the band into four-feet lengths to form groups of strips having a generally square configuration of four by four feet.

As the groups of strips progress toward the rear of the apparatus, selected groups and preferably every other group is turned 90° in a horizontal plane so that the direction of the four-feet ribbons in each group that has been turned is now normal to the path of movement of the groups and normal to the direction of movement of the machine. With selected or alternate groups so orientated, successive groups are then stacked in a vertical array so that selected or alternate groups have their strips lying at right angles to each other. This configuration is hereinafter sometimes referred to as being stacked in criss-cross fashion. Obviously, the weight and friction between adjacent criss-cross layers effectively eliminates the disadvantage of having the strips in one-foot widths and permits a stable stack of sod to be built up on a vertically moving platform at the rear of the machine. In practice, it has been found that stable sod stacks of well over 6 feet high are possible with this stacking arrangement but that stacks about 5 feet high are preferable from a weight standpoint.

Finally, the machine at its rearward end includes a vertically descending platform with a pallet for receiving the criss-cross stacks which, after the stack has reached an appropriate height, is effective to deposit the stack upon the ground behind the machine. When so harvested, the large criss-cross stack can then be picked up by a fork lift or other device and deposited upon a truck bed with no further manual handling of any of the strips until they are ready to be taken off for installation purposes.

It will be seen that much of the manual handling of the strips has been eliminated by this invention, that the possibility of breaking the individual strips through such handling has been eliminated, and the attendant difficulties with folding or rolling sod strips as previously described have also been avoided.

Other objects and advantages of the invention to be described in detail below will be apparent to those skilled in the art. In the preferred embodiment described below, a sod cutting and stacking machine having the capability of severing four continuous strips simultaneously is described; obviously, the principles and advantages of this invention can be used with other numbers of strips such as two, three, five, etc., with the necessary dimensional changes and modifications from the equipment described in the preferred embodiment being apparent to those skilled in the art. It should also be understood that there are various mechanical components or devices of a known nature which could be substituted for the particular apparatus shown in parts of the preferred embodiment for performing a particular function, such as conveying, cutting, etc., which do not necessarily constitute a portion of this invention.

BRIEF DESCRIPTION OF THE DRAWINGS

FIG. 1 is a side view in elevation of a sod cutting and stacking machine constituting a preferred embodiment of this invention, showing in some detail the various components of the invention mounted on a power-driven wheeled chassis;

FIG. 2 is a front view in elevation, taken along line 2—2 of FIG. 1 and showing multiple front end cutting blades of the apparatus;

FIG. 3 is a cross-sectional view in elevation, taken along line 3—3 of FIG. 1 and showing some of the details of the mechanism for turning selected groups of sod strips at right angles to other groups;

FIG. 4 is a view in elevation of the forward end of the apparatus, taken along the line 4—4 of FIG. 1 and showing details of the conveyor elevator which moves the ribbons of sod from the cutting blades upwardly upon the apparatus;

FIG. 5 is a partially schematic side view in elevation of the upper conveyor which extends over the chassis shown in FIG. 1 and which illustrates the progression of sod from the elevator conveyor of FIG. 4 toward the rear of the machine;

FIG. 6 is a view similar to FIG. 5 in showing the mechanism in another operating position;

FIG. 6a is a schematic view of an alternate mechanism for a portion of the machine shown in FIGS. 5 and 6;

FIG. 7 is a side view in elevation of a transverse severing mechanism also seen in FIGS. 1 and 5;

FIG. 8 is a side view in elevation of the rotating mechanism also shown in FIGS. 1 and 5;

FIG. 9 is a top plane view of the rotating mechanism shown in FIG. 8 as it would be positioned prior to turning a selected group of strips; and FIG. 10 is a view of the rotating mechanism shown in FIG. 9 but shown as it would appear after it has completed rotating a group of strips by 90°.

DESCRIPTION OF THE PREFERRED EMBODIMENT

The machine can be conveniently divided into several portions which are described in separate detail below in the general sequence of operations which the machine performs on the sod strips it cuts and stacks.

The Multiple Blade Cutting Mechanism

Referring first to FIG. 1, the entire apparatus is mounted upon and driven by a wheeled chassis, generally designated by reference numeral 10, which includes a pair of rigid structural members 11 which extend forward of the front wheel of the chassis and are joined by a transverse girder 12. Depending from the girder 12 is a bracket 13 which pivotally supports the framework for the multiple blade cutting mechanism. The frame of the chassis extends upwardly on each side from the members 11 and most of the other rigid frame members are not shown for purposes of illustrating other working apparatus supported by the frame.

Referring to FIG. 4, a plurality of rigid yokes 14–17 extend forward from the bracket 13 and have their open arms pivotally secured to a pinion 18 which is secured to the bracket 13. The closed ends of the yokes 14–17 carry depending flanges 19, best seen in FIG. 1, into which are journaled ground rollers 20–23 which are fully rotatable and of sufficient diameter to support the weight of the entire cutting mechanism without becoming embedded or sinking into the sod. As seen in FIG. 2, the forward bridging member of the yokes 14–17 are pivotally secured together by links 24–26 which maintain the yokes 14–17 in fixed spaced-apart relationship but permit a certain amount of vertical shifting between the yokes. Thus if the cutting mechanism traverses over uneven ground, one yoke may be depressed relative to the others by the weight of the mechanism carried by it so that the depth of sod cut remains uniform.

The yokes 14–17 may be elevated off the ground as may be desired when the machine is not cutting sod but is moving from one site to another by a simple lifting mechanism generally designated in FIG. 1 by reference numeral 27. The lift mechanism can be a simple lever-operated tension member moved by the machine operator or can be a cable and winch arrangement which is effective to lift the rollers 20–23 of each of the individual yokes 14–17 off the ground by pivoting the yokes 14–17 about the axis of the pinion 18. In FIG. 1, one of the cutter mechanisms is shown in dotted line position in its upper, non-cutting position.

Each of the yokes 14–17 is provided with an upwardly extending bracket 28–31 whose upper member is a shaft upon which a swinging, U-shaped cutter bar 32–35 is pivoted, as best seen in FIG. 2. The lowermost edge of the cutter bars 32–35 is the horizontal knife edge 36–39 which, as seen in FIG. 2, extends below the lower surface of the ground rollers 20–23 by a distance which defines the depth of the sod cut. This distance, indicated by $d$ in FIG. 2, can be varied by adjustments made in the attachment of the knife edge 36–39 relative to its cutter bar 32–35, as schematically indicated, and will be varied as to the type of sod cut, the speed of operation, the moisture of the soil, etc. In general, sod is usually cut at a depth of between 1 and 2 inches.

Referring again to FIG. 1, a reciprocating mechanism including a link 40 and a driven sprocket 41 operably connected to the lower portion of the cutter bars 32–35 is used to drive the knife edges 36–39 back and forth in a reciprocating pattern. While the details of the cutting blade mechanism and its drive do not form a part of this invention, it can generally be seen from FIG. 1, that rotation of the sprocket 41 about its axis which is carried by a flange 42 will cause the cutter bar 32 and its lower knife edge 36 to reciprocate back and forth, parallel to the path of motion of the machine. The sprocket 41 can be driven by a separate motor mounted on the cutting mechanism or by a series of chains or belt and pulley arrangements coming from a source of power on the chassis itself. When a multiple blade installation is used, it is desirable to program the knife edges 36–39 in an alternating sequence to eliminate vibration or dynamic stress on the parts. For example, the sprockets 41 can be programmed in a four-stroke arrangement similar to a crankshaft for a four cylinder engine so that the sequence and timing of the forward action of the blades is selected for optimum operation in that no two blades are in synchronism.

From the above brief description of the multiple blade cutting mechanism, it will be seen that the cutting mechanism is effective to produce four continuous ribbons of sod, A, B, C and D, cut from the ground as the machine progresses across the field. Referring to FIG. 2, the effective width of a ribbon of sod is determined by the distance between the arms of the cutter bars 32–35, indicated by reference numeral w and that the small space s between the adjacent ribbons is determined by the space between the adjacent arms of adjacent cutting mechanism. In most sod harvesting operations it is desirable to leave a thin line of sod between the harvested portions for seeding purposes which means that the individual harvested ribbons, designated as A–D, leave the cutting mechanism and proceed toward the remainder of the machine spaced apart by the distance $s$.

The Elevator Conveyor Mechanism

Referring again to FIG. 1, as the cut sod ribbons A–D leave the area of the knife edges 36–39, they are pushed rearwardly toward the machine by the motion of the machine over the ground. A plurality of guide rails 50–52, 53–55, 56–58 and 59–61 are suspended from the yokes 14–17, as also seen in FIG. 4, to form a platform or floor for the strips of sod being urged upwardly from the cutting area. To assist the sod strips over this area, it may be desirable to provide a double belt conveyor or other toothed or chain device which lifts or conveys the ribbons toward the elevator conveyor. Such additional conveyor or lifting device is not shown but would be of conventional construction and driven by a separate motor or by a power take-off from the wheel chassis power plant.

The elevator conveyor mechanism for each of the sod strips A–D generally consist of a pair of opposed belt runs including a lower belt 62 and an upper belt 63 for each of the sod strips. (Only one is described since the mechanisms are the same for the elevator for each sod ribbon A–D.) The lower belt 62 includes at least one pair of endless belts or chains having a lower end sprocketed upon a shaft 64 which is secured relative to the transverse girder 12 and an upper end sprocketed upon a shaft 65 which is secured to a rigid member extending above the structural members 11. As best seen in FIGS. 1 and 4, the lower belt 62 is driven such that its upper or outside run is directed upwardly and aft of the chassis while the return run is forward and down. The upper belt 63 is driven so that its lower or inner run moves upwardly and aft. The upper belt 63 has its upper end journaled upon pulleys or sprockets secured to a shaft 66 which is secured to a part of the frame holding the shaft 65 and has its lower end extending around sprockets or pulleys journaled on a stub shaft 67 as seen in FIG. 4. The stub shaft 67 is spaced from the shaft 66 by side rails 68 and 69 and floats in a vertical plane so that the entire upper belt 63 can be pivoted about the shaft 66.

The distance between the upper end of the lower belt run 65 and the upper end of the upper belt run 66, as determined by the vertical position of the bearings for the shaft 65 and 66, is such that the distance between the opposed faces of the belts or chains is slightly less than the depth d of the sod ribbon. Thus the weight of the upper belt run 63, which freely pivots around shaft 66, bears upon the sod ribbon A to create the forces of engagement which cause the oppositely moving belts to convey the ribbon upwardly between their runs toward the top of the elevator conveyor. As seen in FIG. 4, the drive shafts for the upper and lower belts 62 and 63 are shafts 66 and 65, respectively, which are driven by a sprocket and chain mechanism, generally designated by reference numeral 70, driven by a motor 71 or driven by a chain or belt mechanism from the power source of the chassis. Obviously, the shafts 66 and 65 are driven in the opposite direction to provide the opposed belt conveyor movement desired.

Each of the individual ribbons A–D are conveyed upwardly by a pair of opposed belt conveyors similar to that described and numbered in FIG. 4 with reference to ribbon A. Because the ribbons have been harvested in slightly spaced-apart parallel relation, it is desirable for purposes of this invention to bring them together in side-by-side adjacency at the top of the elevator conveyor. For this purpose, it will be noticed that the lower and upper belts 62 and 63, respectively, converge at their upper end so that the space s between the adjacent ribbons A–D is eliminated by progressively drawing them closer together. This can be seen most clearly in FIG. 4 by the partial illustration of ribbons C and D which, at their uppermost ends, are in edge-to-edge adjacency. Using the example given above of a sod ribbon having a width w of one foot, it will be apparent that the group of ribbons A–D at the upper end of the elevator conveyor mechanism is now substantially four feet in width as the ribbons pass the shaft 66 as shown in FIG. 4.

The Horizontal Conveyor and Severing Device

Extending across the top of the machine chassis in horizontal position is a horizontal conveyor 80 comprised of a plurality of endless chains 81 which are led around forward sprockets secured to a shaft 82 and rearward sprockets secured to a shaft 83. This conveyor can be clearly seen in cross section in FIGS. 5 and 6. It includes the plurality of chains 81 but could also be a flat belt conveyor or other endless belts or bands continuously driven by a motor connected to either the forward shaft 82 or rearward shaft 83. As also seen in FIGS. 5 and 6, the forward end of the horizontal conveyor 80 is positioned just aft of the upper end of the elevator conveyor mechanism so that the continuous sod ribbons A–D leave the elevator conveyor mechanism, continue across a transverse guide 84 and are shortly thereafter picked up by the chains 81 of the horizontal conveyor 80.

Between the transverse guide 84 and the horizontal conveyor 80 is a transverse severing mechanism having a blade 85 extending entirely across the group of ribbons A–D and carried by an appropriate actuating mechanism generally designated by reference numeral 86. The blade 85, which chops transversely across the group of ribbons A–D in guillotine fashion, is preferably actuated by a hydraulic or pneumatic system which is carried by a support arm 87 which is secured by uprights to the structural members 11 as seen in FIG. 1. Below the path of the blade 85 and next to the transverse guide 84 is a resilient block 99 which cushions the impact of the blade as it passes through the group of ribbons A–D and assures complete severing as the blade 85 is actuated.

Referring to FIGS. 5 and 6, the horizontal conveyor 80 is desirably run at a surface speed in excess of the surface speed of the elevator conveyor mechanism. Thus each time the blade 85 laterally severs the group of ribbons A–D which has passed from the elevator conveyor to the horizontal conveyor 80, the severed group of strips moves away from the blade at a slightly faster rate than the subsequent ribbons A–D are being supplied to the horizontal conveyor. This provides a small gap g in FIGS. 5 and 6 between the trailing end of a group of strips and the leading end of the subsequent group of strips. In practice, it has been found that a conveyor speed for the horizontal conveyor 80 which is ten per cent in excess of the speed of the elevator conveyor is satisfactory to separate the ends from one another to create a gap g. Finally, the control for the actuation of the blade 85 in this preferred embodiment is a limit switch 89 placed adjacent the edge of the horizontal conveyor 80 at a horizontal distance from the blade 85 corresponding to the desired length of the strips to be cut. In this example, when four one-foot wide ribbons are cut and fed to the blade 85, it is desired that each of the ribbons is cut into four-feet strips. Accordingly, the limit switch 89 is placed approximately 4 feet downstream of the position of the blade 85 so that when the leading edge of the ribbons A–D contacts the limit switch 89, the blade 85 is actuated to cut these ribbons into four-feet strips. A timed control or other contact sensing device can be used in place of the limit switch 89 to time the actuation of the blade 85 so that it cuts the ribbons A–D into any desired length.

As thus far described, the initially cut endless sod ribbons A–D are now positioned upon the forward part of the horizontal conveyor 80 in parallel side-by-side adjacency and have been severed into strips four feet long by the blade 85 and are progressing away from the blade at a speed slightly in excess of the speed of the ribbons passing the blade 85 so that the lateral gap g exists between the forward and trailing surfaces of the two groups of sod.

The Strip Rotating Mechanism

FIGS. 1, 3, 5, 6 and 8-10 best illustrate the various details of the strip rotating mechanism. This mechanism, generally designated by reference numeral 100, consists of a generally horizontal frame made from side bars 101 and 102 and transverse bars 103 and 104. Extending between the side bars 101 and 102 are a plurality of parallel spaced-apart pipes 105 which are journaled for rotation about their axes. Each of the pipes 105 carries a plurality of arcuate-shaped wire grippers 106 which are wound about or secured to the pipes 105 and have pointed ends extending out at a radius much larger than that of the pipes 105. As can be best seen in FIG. 8, the ends of the wire grippers 106 are positioned such that rotation of the pipe 105 carrying that wire will cause the pointed end to swing through a path below the position of the pipes 105 and their carrying frame, as indicated by the dotted line showing. Still referring to FIG. 8, the pipes 105 are secured to levers 107 with the upper ends of the levers 107 being alternately connected to racks 108 to form a toggle arrangement such that movement of the rack 108 shown in FIG. 8 to the left will cause every other gripper 106a to turn counterclockwise so that the point moves downwardly and to the left. Similarly, the opposite grippers 106b are carried by pipes 105 connected to another rack 109 which, when moved in the opposite direction, will also cause the grippers 106b to move in a clockwise direction. As shown, with the alternate grippers 106a and 106b positioned in opposite directions and with their pipes 105 being turned in opposite directions, the points of the grippers will move downwardly and inwardly into sod when it is positioned immediately below the level of the pipes 105 and their frame.

FIGS. 9 and 10 best show a mechanism for moving the racks 108 and 109 and thus rotating the grippers 106a and 106b. A pivot beam 110 is pivotally secured at its center to an extension of the frame of the rotating device 100 and has each end pivotally secured to a portion of the racks 108 and 109. A toggle extension 111 rigidly secured to the pivot beam 110 has one end pivotally secured to the piston rod 112 of a pneumatic or hydraulic cylinder 113 whose other end is secured relative to the frame by flange 114. As will be apparent to those skilled in the art, extension or retraction of the piston rod 112, caused by actuation of the pneumatic or hydraulic pressure supplied to the cylinder 113, will cause the two racks 109 and 108 to reciprocate back and forth, thus causing extension or retraction of the points of the gripping wires 106a and 106b as previously explained.

The entire rotating mechanism 100 including the frame and its pipes 105 and grippers 106, etc., is pivotally suspended from the upper support arm 87 by a substantial piston 115 secured to a plate 116 welded or otherwise secured to the frame. The piston 115 is supported for reciprocation by a cylinder 117 secured on a vertical axis to a cover plate 118 which extends across the support arm or arms 87. (The cover plate 118 is shown partially broken away in FIG. 10 and is not shown at all in FIG. 9.) The piston 115 and its cylinder 117, as schematically shown in FIGS. 5 and 6, is of double action variety so that the alternate application of fluid pressure on each side of the piston head within the cylinder 117 will cause the piston and the entire sod rotating mechanism 100 to move up and down. An arcuate slot 119 is cut through the cover plate 118 and through this slot extends a rigid pivot pin 120 which is secured in a vertical position with its lower end fixed to the plate 116 on the rotating frame and with its upper end extending through the arcuate slot 119 to form a pivot shaft 121. A bell crank throw 122 is secured about the outer housing of the cylinder 117 and has an opening receiving the pivot shaft 121 previously described. A laterally extending piston and cylinder combination 123, 124 extends from the support arm 87 and is pivotally secured to the pivot shaft 121 as best seen in FIGS. 9 and 10. Extension of the piston 123, from its position shown in FIG. 9 to its position shown in FIG. 10, will force the bell crank throw 122 to pivot the piston 115 and the entire reciprocating frame 100 by 90° as the pivot pin 121 translates through the slot 119. Conversely, retraction of the piston 123 from its position shown in FIG. 10 to that of FIG. 9 will cause the entire mechanism including the reciprocating frame 100 to translate 90° in a clockwise direction. Again, suitable pneumatic or hydraulic control would be attached to the cylinder 123 for controlling its actuation in either direction. It will now be apparent that the entire strip rotating mechanism 100 including the frame and shaft 105 and grippers 106a and 106b can be translated in a horizontal plane from its normal for and aft position shown in FIG. 9 to its transverse position shown in FIG. 10 by actuation of the piston and cylinder combination 123 and 124 and also that the entire frame mechanism including grippers 106a and 106b can be moved up and down from an upper position remote from the horizontal conveyor to a lower position close to the horizontal conveyor by actuation of the piston and cylinder mechanism 115 and 117.

Referring to FIGS. 5 and 6, the strip rotating mechanism 100 is so programmed that when a group of sod strips A-D has passed to the latter portion of the horizontal conveyor 80, a limit switch 125 is actuated to start the following sequence of events: (1) starting with the rotating device in its upper normal position as shown in FIG. 5, the piston 115 is extended from cylinder 117 to lower the rotating device downwardly upon the sod strips A-D therebelow in a single quick movement; (2) upon reaching this lower position, the piston and cylinder combination 112 and 113 is actuated to move racks 108 and 109 causing the wire grippers 106a and 106b to move from their retracted position, as they are shown in FIG. 8, to an extended position as they are shown in FIG. 5; this causes the wires to grip each strip of sod of the group by embedding the ends therein; (3) at this time, hydraulic pressures to the cylinder 117 are reversed so that the entire rack moves to its upward position as shown in FIG. 5, carrying with it the suspended sod strips well above the level of the horizontal conveyor 80 so that there is sufficient vertical room for a subsequent group of strips to move below the suspended sod strips; (4) as soon as the frame and suspended strips reach this upper position, hydraulic fluid to the piston and cylinder combination 123 and 124 causes the entire frame to rotate 90° from its position of FIG. 9 to that of FIG. 10, so that the suspended sod strips are now turned at right angles to their former position; (5) by this time, a subsequent group of sod strips has progressed generally to a point where its leading edge approaches the limit switch 125 whose second actuation causes reversal of the fluid flow to the piston and cylinder combination 112, causing the wire grippers 106a and 106b to retract, thus dropping the rotated sod strips directly upon the tops of the second group of strips therebelow; (In practice, this drop of only several inches does not harm the sod.); (6) the rotating device then indexes 90° in reverse to return to its original position of FIG. 9. The mechanism has now completed a criss-cross stacking of two layers of strips, the lower layer retaining its initial orientation and the upper layer being placed transversely across the original position. As the horizontal conveyor 80 takes this double stack of criss-cross strips away from the rotating device, a third group of strips will pass below the position of the rotating device and again strike the limit switch 125 which will start the sequence previously described. Because the horizontal conveyor 80 is run at a speed in excess of that of the cutting device and elevating conveyor to provide the gap $g$ between groups of strips, it has been found that the above-described operations can be accomplished continuously without the necessity of starting/stopping any of the continuously moving conveyor elements, thus speeding up the harvesting process and also increasing the efficiency and durability of the continuously running devices.

The Reciprocating Tray and Vertical Shutter

FIGS. 1, 3, 5 and 6 illustrate the operation of the horizontal reciprocating tray, generally designated by reference numeral 130 whose function is to receive the double criss-cross stack of sod strips from the latter end of the horizontal conveyor 80 and to deposit the double stack of strips upon a vertically movable platform. While it might be possible for a horizontal conveyor of the type shown to push the double stack of strips upon a descending platform to form a vertical array of criss-cross strips, the double strips in this condition are quite heavy and, because of the friable nature of sod, efforts to push the strips onto the surfaces of other strips and to slide them into position have been unsuccessful. Accordingly, the reciprocating tray 130 is adapted to receive the double layer of criss-cross strips from the horizontal conveyor 80 under the conditions of zero relative motion and to deposit the stack in the desired position upon previous strips which form a vertical stack. This can be accomplished through cooperation with a vertical shutter 131 shown in FIG. 6a or without such a shutter, as shown in FIGS. 5 and 6.

The horizontal reciprocating path of the reciprocating tray 130 is generally below that of the horizontal conveyor 80 and extends from a retracted position in which the tray 130 lies completely below the rearward end of the conveyor 80, as shown in FIG. 6, to an extending position in which the tray lies completely above the path of the elevator platform, as shown in broken line in FIG. 6. The tray itself comprises a plurality of freely journaled rollers 132 extending transversely across the mechanism with their axes at right angles to the movement of the sod strips A–D on the conveyor. The rollers 132 are journaled in a rigid frame which, as best seen in FIG. 3, is guided for its movement parallel to the movement of the conveyor by guide wheels 133 which run along tracks 134 secured to frame members 135 on either side of the chassis. A drive mechanism for the reciprocating tray 130 is schematically shown in FIGS. 5 and 6 and may include a chain 136 having one end secured to a post 137 attached to the tray 130 and the other end secured to a pin 138 on the outer end of an extension arm 139 which extends forward from the tray 130. The chain 136 is guided through appropriate sprockets and is driven by a reversible hydraulic or fluid motor 140. Starting with the tray in its retracted position as shown in FIG. 6, hydraulic actuation of the motor 140 in a counterclockwise direction will pull on the end of the chain attached to the pin 138, thus forcing the tray 130 to the right toward its extended position; conversely, actuation of the motor 140 in a clockwise direction will pull on the chain attached to the post 137 to move the tray to the left toward its retracted position. As previously stated, the speed of the motor 140 and attendant chain connections is such that the speed of extension of the tray 130 to the right toward its extended position is the same as the surface speed of the horizontal conveyor 80; accordingly, as the double criss-cross stack of sod strips shown in FIG. 6 leaves the end of the conveyor 80, it moves slightly downward on the reciprocating tray 130 which is moving to the right at the same speed at the stack. This is effective to deposit the double criss-cross sod strips upon the tray 130 with zero horizontal relation motion so that the alignment of the strips is not disturbed and there is little breakage or dirt loss during this transfer from the conveyor 80 to the tray 130. Any possible differences in relative speed can be compensated for by the action of the rollers 132 which can turn to accommodate any variation as the sod strips are received by the tray.

At the time that the tray reaches its fully extended position and is stopped by stopping the motor 140, the double stack of sod strips is completely off of the conveyor 80 and resting upon the tray, as shown in the dotted line portion of FIG. 6. At this time, the motor 140 is reversed to retract the tray to its position beneath the horizontal conveyor 80. FIG. 5 shows the tray in partially retracted position and illustrates one manner in which the sod strips are removed from the tray. Because the strips on the conveyor 80 will move down about two inches to the level of the tray 130, an abutment flange 141 is effective to prevent the stacked strips from following the retracting movement of the tray 130. While this simple mechanism has proved satisfactory, it has been found that a more satisfactory mechanism is a vertically positioned shutter 131 extending transversely across the end of the horizontal conveyor 80. The shutter 131 schematically illustrated only in FIG. 6a, extends transversely across the end of the conveyor 80 and is freely pivoted on a horizontal shaft 142 and has its lower edge abutting the stop member 141. It will be seen that as the sod strips move off the conveyor 80 to the right in FIG. 11, they will swing the shutter 131 open to its dotted line position but, as the tray 130 is retracted, the shutter will swing closed and abut against a modified stop member 141 to effectively wipe off the sod strips from the retracting tray 131.

The Vertical Platform

The vertical platform which receives the criss-cross groups of sod strips is illustrated in FIGS. 1, 5 and 6. A pair of vertical threaded shafts 150 and 151 is positioned on each side of the chassis at the rear of the machine by upper and lower bearings 152 and 153 which are secured relative to the frame of the chassis. The upper end of the shaft 151, as seen in FIG. 1, is connected to a hydraulic motor 154 having suitable controls for rotating the threaded shaft 150 in either direction. A chain sprocket 155 secured to the shaft 150 carries a drive chain (not shown) transversely across the rear of the machine to the other shaft 151 so that the motor 154 can effectively turn both the shafts in synchronism.

Each of the shafts is turned into a threaded collar 156 and the collars are rigidly secured to a transverse cross member 157 extending across the rear of the machine. Extending rearwardly from the transverse cross member 157 and collars 156 are a pair of rigid platform blades 158 and 159 which together form the platform for supporting the sod stack. I use, a pallet 160, best seen in FIG. 3, is placed over the platform blades 158 and 159 and the groups of sod strips are stacked thereupon. It will be apparent that as the threaded shafts 150 and 151 are rotated in one direction, the platform and pallet 160 will move up; when rotated in the other direction, the platform and pallet 160 will move down.

When initially starting to stack a group of cut strips, the platform blades 158 and 159 and the pallet 160 is brought upwardly to the general level just below the path of the reciprocating tray 130. With the pallet 160 in this position, the first movement of the reciprocating tray 130 will deposit one double group of criss-cross strips upon the pallet as previously described. A limit switch 161 may be placed at the rearmost end of the elevator platform or can be elsewhere positioned to sense the retracting movement of the reciprocating tray 130 so that the platform blades 158 and 159 are moved downwardly by the shaft 150 and 151 a distance equal to the thickness of the double groups of strips deposited thereon. (In practice, this distance will be about 3-4 inches.) Accordingly, each time that a double group of strips is deposited upon a previous group, the pallet 160 moves downwardly as the stack progressively becomes higher. FIGS. 5 and 6 illustrate this general sequence of operation. As the pallet approaches the bottom of its run, as indicated in broken line of FIG. 1, the blades 158, 159 move almost to ground level at which time the lower portions of the pallet 160 strike the ground and the pallet and sod stack is moved off the machine as the machine progresses forward across the field. It is then necessary only for an operator to place a new pallet upon the blades 158, 159 and to quickly return the platform and pallet 160 to its uppermost position to start the cycle again. This can be rapidly done by programming the hydraulic motor 154 to quickly raise the platform from its lowermost to uppermost position, independent of the descending speed which is accomplished in step-by-step fashion.

From the above description taken as a whole, it can be understood that the preferred embodiment described is capable of continuously harvesting multiple endless ribbons of sod and cutting and stacking these ribbons in sturdy stacks upon a pallet. From there, the sod strips may be picked up by fork lift or like device and deposited upon a truck or railroad car for transportation to the marketing site or site of installation. It will thus be apparent that a maximum of two persons is needed to continuously run the machine. One worker drives the machine, generally from the controls shown in FIGS. 1 and 4 while a second worker is necessary to replace the pallet 160 after it has been dropped by the machine as previously described.

To illustrate the economics of the machine of this invention, a machine of the type previously described in this preferred embodiment having four separate cutting mechanisms for harvesting one-foot ribbons of sod has been tested successfully at a ground speed of about 50 feet per minute. This means that the machine can cut and stack 200 square feet of sod per minute and pile this sod into criss-cross stacks 5 feet high. Using relatively thick sod of approximately 2 inches depth, such a stack would contain 30 layers of sod, each layer comprising 16 feet square of sod or a total of 480 square feet per stack. At a continuous harvesting rate of 200 square feet per minute, stacks of the size described could be harvested at a rate of 25 per hour by the machine and the two attendants.

It will be apparent to those skilled in the art that various modifications may be made to the preferred embodiment described above and the same can be made without departing from the spirit and scope of the following claims.

I claim:

1. An apparatus for cutting and stacking lengths of sod comprising, a wheeled chassis for traversing a sod field, a horizontal cutting mechanism at the forward end of the chassis having means for cutting from the field a plurality of continuous parallel ribbons of sod as the chassis traverses the field, means for conveying such cut sod ribbons in generally parallel fashion from the cutting mechanism rearwardly on said chassis, means rearward of the cutting mechanism for transversely severing the advancing parallel ribbons into groups of strips of generally equal length, means for rotating alternate groups of severed strips at right angles to other groups of strips, and means for stacking such rotated and non-rotated groups of severed strips in criss-cross fashion to provide a vertical stack of sod strips.

2. The apparatus of claim 1 wherein said horizontal cutting mechanism includes a plurality of horizontal blades positioned end-to-end in a row and wherein the sum of the length of said blades is generally equal to the length of said strips which are severed from said continous ribbons.

3. The apparatus of claim 1 wherein said cutting mechanism includes a plurality of horizontal blades positioned end-to-end in a row and having adjacent ends laterally spaced apart a distance sufficient to leave a narrow band of uncut sod between the areas cut by each of said blades.

4. The apparatus of claim 3 wherein said means for conveying such cut sod ribbons includes a separate conveyor mechanism for each ribbon extending generally from said cutting mechanisms to said transverse severing mechanism, said separate conveyor mechanisms converging together in a single plane at said severing mechanism to eliminate the lateral space between adjacent sod ribbons whereby said ribbons are presented to said severing mechanism in a single plane with their lateral adjacent edges in abutment to each other.

5. The apparatus of claim 1 which includes an elevating conveyor for transporting said endless ribbons in side-by-side parallel fashion upwardly and rearwardly over said chassis from said horizontal cutting mechanism to said transverse severing means and a second horizontal conveyor for transporting in side-by-side parallel fashion said groups of severed strips from said transverse severing means to said rotating means.

6. The apparatus of claim 5 wherein said second horizontal conveyor is operated at a speed in excess of that of said elevating conveyor such that successive groups of severed strips become spaced apart from one another.

7. The apparatus of claim 1 wherein said means for rotating alternate groups of strips comprises a horizontal frame suspended above the path of said groups of strips, said frame being journaled for rotation about an axis normal to the path of said groups of strips and movable from a first position in contact with the upper surface of a group of strips to a second position above and remote therefrom, said frame including gripping members which, when extended, grip each strip of a group of strips, and means for sequentially causing said frame to (1) move to said first position in contact with the upper surface of a group of strips, (2) extend said gripping members to grip each strip, (3) retract said frame to said second position above and remote from the path of said groups of strips, (4) rotate 90° to turn said gripped group at right angles to a subsequent group, (5) retract said gripping members to drop such turned group upon the upper surface of the subsequent group.

8. The apparatus of claim 7 wherein said extensible gripping members comprise a plurality of parallel pipes extending laterally across said frame with a plurality of arcuate shaped wire grippers extending radially outwardly from each of said shafts with means for rotating said shafts from a first position where said arcuate grippers are retracted away from the lower surface of said frame to a second position where said arcuate grippers are extended below said frame into gripping engagement with a group of sod strips.

9. The apparatus of claim 8 wherein alternate pipes are rotated in opposite directions between said first and second positions and wherein the arcuate shaped wire grippers on alternate shafts extend in opposite directions to each other.

10. The apparatus of claim 1 wherein said means for stacking such rotated and non-rotated groups of strips in criss-cross fashion includes a vertically movable platform having an upper position substantially level with the level of said conveying means at the location of said rotating means, and a lower position substantially at ground level, and means for sequentially lowering said platform from its upper position in increments equal to the height of groups of sod deposited thereon by said conveyor.

11. The apparatus of claim 10 which further includes a reciprocating tray having an extended position over the path of said vertically movable platform and a retracted position below the end of said conveying means with said tray positioned substantially level with the upper position of said vertically movable platform and said conveying means, and means for moving said tray towards its extended position at a speed substantially equal to the speed of said conveyor whereby groups of severed strips on said conveyor are deposited upon said tray with zero relative motion between said tray and deposited group of strips.

12. The apparatus of claim 11 which further includes a vertical shutter operably connected to the chassis and positioned between the end of said conveying means and the path of said vertically movable platform, said shutter including pivoting means permitting outward movement away from said conveying means but not inward movement towards said conveying means whereby groups of strips passing from said conveying means onto said extending tray will swing said shutter outwardly and whereby retraction of said tray towards its position below the end of said conveyor will cause said groups of strips to strike said shutter and be pushed off said retracting tray at a position above said vertically movable platform.

13. The apparatus of claim 11 wherein said reciprocating tray comprises a platform of spaced apart, horizontal rollers with the axes thereof normal to the direction of reciprocable movement of said tray.

14. A sod cutting and stacking machine comprising means for continuously cutting parallel ribbons of sod from the ground, means for conveying said parallel ribbons in side-by-side relation from said cutting means to an elevated downstream position upon said machine, means along said conveying means downstream of said cutting means for laterally severing the advancing parallel ribbons into groups of parallel sod strips, means downstream of said severing means for rotating selected groups of severed parallel sod strips at right angles to other such groups, and means for stacking said rotated and non-rotated groups upon each other in criss-cross fashion to form a vertical stack of sod strips.

15. A sod stacking machine comprising means for conveying parallel ribbons of sod in side-by-side relation from a field to an elevated position on the machine, means for laterally severing said parallel ribbons into groups of parallel sod strips and, means for rotating selected groups of parallel sod strips at angles to other such groups and for stacking said rotated and non-rotated groups upon each other to form a vertical stack of sod strips.

16. A method of continuously cutting and stacking sod strips comprising the steps of continuously cutting parallel ribbons of sod from the ground, conveying said parallel ribbons in side-by-side relation from the ground to an elevated position, laterally severing said parallel ribbons as a group to provide groups of parallel strips of finite length, rotating selected groups of strips at right angles to other such groups, and stacking said rotated and non-rotated groups upon each other in criss-cross fashion to form a vertical stack of sod strips.

17. The method of claim 16 in which said selected rotated groups comprise every other group of strips on said conveyor.

18. The method of claim 16 which further includes the step of depositing upon the ground said vertical stack of sod strips when such stack reaches a height substantially equal to the height of said elevated position.

19. The method of claim 16 wherein said parallel ribbons are laterally severed to form strips whose length is substantially equal to the total width of said parallel ribbons.

* * * * *